United States Patent
Wolff et al.

(10) Patent No.: US 9,322,498 B2
(45) Date of Patent: Apr. 26, 2016

(54) MAGNETIC BREAKAWAY COUPLING WITH SWIVEL CONNECTION

(71) Applicants: Brian P Wolff, Raytown, MO (US); Arthur C Fink, Jr., Lonedell, MO (US)

(72) Inventors: Brian P Wolff, Raytown, MO (US); Arthur C Fink, Jr., Lonedell, MO (US)

(73) Assignee: Husky Corporation, Pacific, MO (US)

( * ) Notice: Subject to any disclaimer, the term of this patent is extended or adjusted under 35 U.S.C. 154(b) by 0 days.

(21) Appl. No.: 14/120,847

(22) Filed: Jul. 1, 2014

(65) Prior Publication Data

US 2014/0318650 A1    Oct. 30, 2014

Related U.S. Application Data

(63) Continuation-in-part of application No. 13/986,110, filed on Apr. 2, 2013.

(60) Provisional application No. 61/687,237, filed on Apr. 20, 2012.

(51) Int. Cl.
*F16L 37/32*  (2006.01)
*F16L 37/00*  (2006.01)

(52) U.S. Cl.
CPC .............. *F16L 37/004* (2013.01); *F16L 37/32* (2013.01); *Y10T 137/87941* (2015.04)

(58) Field of Classification Search
CPC .............. Y10T 137/87933; Y10T 137/87941; Y10T 137/87949; Y10T 137/87957; Y10T 137/87965; F16L 37/004; F16L 37/32; F16L 2201/20; F16L 55/1007; F16L 55/1015
USPC ................. 137/68.14, 68.15, 614.01–614.05; 251/149.7; 285/1, 2, 9.1
See application file for complete search history.

(56) References Cited

U.S. PATENT DOCUMENTS

| | | | | |
|---|---|---|---|---|
| 3,558,163 A * | 1/1971 | Moore et al. | ............... | 285/147.3 |
| 4,615,547 A * | 10/1986 | Sutcliffe et al. | ............ | 285/121.6 |
| 4,763,683 A * | 8/1988 | Carmack | .................... | 137/68.15 |
| 4,804,206 A * | 2/1989 | Wood et al. | .................. | 285/276 |
| 4,827,977 A * | 5/1989 | Fink, Jr. | .................. | 137/614.04 |
| 4,896,688 A * | 1/1990 | Richards et al. | ........... | 137/68.15 |
| 4,905,733 A * | 3/1990 | Carow | ..................... | 137/614.04 |
| 5,115,836 A * | 5/1992 | Carow et al. | ............. | 137/614.04 |
| 5,178,422 A * | 1/1993 | Sekerchak | ................. | 285/144.1 |
| 5,209,262 A * | 5/1993 | Carow et al. | ............. | 137/614.04 |
| 5,365,973 A * | 11/1994 | Fink et al. | ............... | 137/614.04 |
| 5,433,247 A * | 7/1995 | Guertin | .................... | 137/614.04 |
| 5,529,085 A * | 6/1996 | Richards et al. | ........... | 137/68.15 |
| 5,570,719 A * | 11/1996 | Richards et al. | ......... | 137/614.04 |
| 5,615,706 A * | 4/1997 | Guertin | .................... | 137/614.04 |
| 6,192,934 B1 * | 2/2001 | Coates et al. | ............ | 137/614.04 |
| 6,550,817 B1 * | 4/2003 | Mitchell | .................... | 285/147.1 |
| 6,899,131 B1 * | 5/2005 | Carmack et al. | ......... | 137/614.04 |
| 7,165,576 B2 * | 1/2007 | Carmack et al. | ......... | 137/614.04 |
| 7,252,112 B1 * | 8/2007 | Imler et al. | ............... | 137/614.04 |
| 7,575,023 B2 * | 8/2009 | Fraser | ..................... | 137/614.04 |
| 7,793,987 B1 * | 9/2010 | Busch et al. | ................... | 285/9.1 |
| 7,980,173 B2 * | 7/2011 | Carmack et al. | .................. | 285/1 |
| 8,210,572 B2 * | 7/2012 | Davis | ............................ | 285/9.1 |
| 8,578,957 B2 * | 11/2013 | Wolff | ......................... | 137/68.15 |

* cited by examiner

*Primary Examiner* — Craig J Price
(74) *Attorney, Agent, or Firm* — Paul M Denk

(57) ABSTRACT

A breakaway coupling including a pair of sleeves, one sleeve fitting within the other, each sleeve provided with a connector body, and a hose connector secured with one of the connector bodies. The first sleeve holds a metal annulus, while the second sleeve secures a ring separator, counterbored, to secure a series of round magnets therein, so that when the sleeves and their connector bodies are brought together, they are secured by the magnets into connection. When excessive force is encountered, the breakaway will separate, to prevent further discharge of fuel from the nozzle. A swivel connector secures with one of the connector bodies.

17 Claims, 5 Drawing Sheets

MAGNETIC BREAKAWAY COUPLING WITH SWIVEL CONNECTION

CROSS REFERENCE TO RELATED APPLICATION

This continuation-in-part patent application claims priority to the non-provisional patent application having Ser. No. 13/986,110, filed on Apr. 2, 2013, which claims priority to the provisional patent application having Ser. No. 61/687,237, filed on Apr. 20, 2012.

FIELD OF THE INVENTION

The concept of this invention is the fabrication of a breakaway connector, for use within a fuel line, and one that is assembled and secured together through the use of a plurality of strategically placed magnets, that maintains the coupler in its assembled and useful position when installed in a fuel line hose, but when the hose is subjected to excessive force, such as when a vehicle inadvertently drives off with the fuel dispensing nozzle still located within the fill pipe of the automobile, the breakaway coupling separates to prevent fuel spillage and further damage to the dispensing system, or the vehicle. In addition, the concept of this invention is to utilize uniquely structured magnetic coupling means that requires significant force to cause separation of a fuel line breakaway coupler, which satisfies the conditions and the parameters of the force necessary to separate a coupling so that its usage within a fuel line assembly can be utilized throughout the world. Furthermore, the concept of this invention is to couple the magnetic breakaway coupling with a swivel connection, so that the device can also be used in close proximity with the dispensing nozzle, or high up upon the fuel dispenser, and be capable of allowing the nozzle and its hose to be manipulated into various different positions, while used for fuel dispensing.

BACKGROUND OF THE INVENTION

The dispensing of fuel as at a service station, of a more recent vintage, substantially includes the dispensing and sale of gasoline through the self service method of refueling ones vehicle. This has now been occurring for over the past thirty to forty years. Previously, when gasoline was dispensed, it was done by the service station attendant, who would locate the nozzle within the vehicle tank, dispense the gas, wipe the windows, clean the headlights, and then replace the nozzle back into the dispenser, once refueling has been accomplished. Rarely was there ever a problem of causing damage to the dispensing equipment, because the attendant made sure everything was in order, and the nozzle was reinstalled within its dispenser, with little or no chance of an inadvertent drive off by the vehicle operator. But, since self service has come into existence, it is a more frequent occurrence that once a driver has applied self service to fill up his/her fuel tank, and either make payment at the pump, or to go inside the facility to pay by cash or credit card, it does more frequently occur that the location of the fuel dispensing nozzle, in the vehicle fill pipe, is forgotten, and the driver will sometimes drive off, pulling the nozzle and the fuel hose with them, resulting in substantial damage to the dispensing system, its hose, the nozzle, and encounter fuel spillage.

As a result of the foregoing, it has become a necessity to include a form of breakaway coupling within the fuel dispensing hose, and usually they can be found high up on the hose near the dispenser, and ready for application when necessary. Thus, should the driver forget, and drive off with the nozzle still in the vehicle, while the hose may be stretched, once it reaches a specified force, such as approximately 100 lbs or more, the breakaway coupling will separate, its internal check valves will be released into closure, and thereby preventing any further flow of fuel, and even stop any back flow of fuel from the nozzle through the separated hose, for spilling onto the ground. By this time the driver should have been alerted to the fact that something is wrong, that the dispensing nozzle may have been left within the fill pipe, and therefore, immediately stops, in an attempt to remedy the problem. At this stage, the station attendant can look over the equipment, and if it does not appear that any damage has been sustained, he can simply reinstall the breakaway connector, and place the dispensing system back into immediate service, as required.

The assignee of this current invention and patent application has received many United States patents upon various types of breakaway hose coupling devices.

For example, U.S. Pat. No. 4,827,977 shows one such Breakaway Hose Coupling, which is generally held in position and coupled by means of detents that secure the coupling in its usable position. But, when an excessive force is encountered upon the fuel line hose, the detents separate from the coupling and allow the pair of fittings to separate, to prevent further damage to the nozzle, or to the hose and the dispenser to which it connects. Such also prevents fuel spillage.

U.S. Pat. No. 5,365,973 shows another Break-Away Concentric Hose Coupling. It likewise is held into position through the use of fittings, and which coupling can be reconnected, after it has been inadvertently separated. The coupling also includes one or more check valves, which prevent the further flow of fuel from the separated hose, when decoupling occurs.

U.S. Pat. No. 6,192,934 shows another Break-Away Concentric Hose Coupling. This coupling is held together through the use of a series of springs, that maintain the coupling in its useable condition, but which separates when excessive force has been encountered.

Another U.S. Pat. No. 6,182,695 shows a further Breakaway Coupling and Coupler Therefor. This one is held in its usable position through the use of a series of detent balls.

There is another U.S. Pat. No. 7,575,023, that shows a Disposable Breakaway Nozzle Connector, and in this instance, is a separable connector, that incorporates a pair of the check valves to prevent fluid discharge when an untimely decoupling of the connector occurs. These are all for application within a fuel line hose, connected to a fuel dispenser.

The applicant has other applications pending, as can be noted in the cross reference for this particular application.

Various other breakaway hose couplings can be seen in the United States patent to Carmack, et al, U.S. Pat. No. 6,899,131, upon a Breakaway Hose Coupling with Manual Rotational Separation, and which attains its separation through a manual rotation of its two male and female tubular valve bodies.

Other breakaway couplings can be seen in the patent to Carmack, U.S. Pat. No. 4,763,683, which is a Breakaway Coupling for a Coaxial Fuel Supply Hose.

Of more recent vintage, is the use of magnets for holding the breakaway coupling together, and which coupling when subjected to a significant force, such as in the range of 150 lbs of pressure, as promulgated by various state regulations, such as the California Air Resources Board, subjects that type of force to a breakaway coupling, the magnets separate the coupling and allow the standard internal check valves to close, to prevent any further fuel flow or spillage. This can also be seen in the Carmack U.S. Pat. No. 7,252,112, which provides a Breakaway Hose Coupling with a Magnetic Connection. In this particular breakaway, the magnets used are arcuate permanent magnets, made of ferrous metal, and as can be seen in its FIG. 2, these magnets are held in position by means of location within an annular groove, within its annular support member, to function as the means for engaging a strike member to hold the connection during routine usage. This device also defines the use of cover members, one that surrounds the other, in a telescopic relationship.

Another breakaway hose coupling utilizing magnets is also shown in the United States patent to Imler, et al, U.S. Pat. No. 7,487,796, upon a Breakaway Hose Coupling with a Magnetic Connection. This particular unit also uses a plurality of circumferentially spaced arcuate permanent magnets, which are recessed within its associated groove, of its supporting member, to hold the coupling in place.

The use of telescoping sleeves in releasable fluid couplings can be seen in the early U.S. Pat. No. 3,317,220, in addition to U.S. Pat. No. 3,715,099. Furthermore, U.S. Pat. No. 4,691,941 shows the use of sleeves within fluid couplings. In addition, U.S. Pat. Nos. 4,905,733, and 6,283,151, show the use of sleeves within breakaway couplings.

With regard to the use of magnets for forming couplings, back as early as the 1960's, U.S. Pat. No. 3,181,895, shows annular magnets used in a Quick-Connect Magnetic Couplings for a high pressure flow line. It can be seen that these are also annular magnets.

U.S. Pat. No. 3,586,048, shows a Magnetic Coupling, of a quick disconnect type. This patent describes the use of permanent magnets that encircle the body member of a coupling.

U.S. Pat. No. 4,060,110, discloses a Vapor Recovery Nozzle that utilizes a permanent magnet to control its operations.

U.S. Pat. No. 4,262,712, shows a Magnetically Latchable Liquid Dispensing Nozzle. The shown magnet is radially disposed about the nozzle spout.

U.S. Pat. No. 4,049,295, shows a Magnet Couplings for Metal Tubes, wherein permanent magnets are used to provide for connection of the tubes that carry fluids, especially gases, during usage.

U.S. Pat. No. 6,334,474, shows the use of magnetic units for holding various components of a breakaway means that provides a signal when a vehicle has inadvertently driven away with the nozzle in its fuel tank.

U.S. Pat. No. 5,096,230, shows the use of circular magnets to form a Quick Release Adapter for Connecting an Exhaust Removal Hose to a Vehicle Tail Pipe Using Magnets. These are round magnets, as shown.

U.S. Pat. No. 5,165,439, described as a Frangible Connectors, shows the use of permanent magnets within a breakaway connection for a fuel line. These permanent magnets are provided in a circular array around the flow line. See its FIG. 59.

U.S. Pat. No. 5,263,511, shows the use of magnets for holding vapors within a vehicle fuel tank.

The patent to Krynicki, U.S. Pat. No. 5,419,354, discloses the use of magnets for holding a separable connector within a fluid passage line.

U.S. Pat. No. 5,464,041, shows a Magnetically Latched Multi-Valve System for a fluid flow line.

U.S. Pat. No. 7,753,079, discloses Magnetic Coupling for Sprayheads.

U.S. Pat. No. 3,104,088, discloses a Quick Connect Coupling, utilizing magnets.

U.S. Pat. No. 2,912,263 shows an Internal Sleeve Type Pipe Coupling with Magnetically Secured External Sleeve Means.

U.S. Pat. No. 2,793,057, discloses a Magnetic Hose Coupling.

The patent to Busch, et al, U.S. Pat. No. 7,793,987, shows the use of circular magnets for providing a magnetic coupling assembly for coupling portions of a gas delivery system together. It shows a multiple array of round magnets located around the periphery of the gas flow delivery system.

These are examples of a full array of prior art materials that disclose the use of permanent magnets, even round magnets, for use for holding flow lines together, and even fuel flow lines, and which magnets have even been used in breakaway coupling mechanisms, to hold its components together, during their application and usage. Hence, the prior art is replete with the use of permanent magnets for providing couplings within pipes and passageway structures as can be noted.

In fact, as previously alluded to, the California Air Resources Board "CARB" dictates that a breakaway connector must be able to resist pressures up to 100 lbs, but will separate at that magnitude of force, when a force greater than 100 lbs of pressure is exerted upon the fuel flow line for the gasoline dispenser system. But, of more recent regulation, the European market requires that the breakaway force necessary to separate a fuel line breakaway connector must be of greater magnitude, even greater than 200 lbs of pressure, which necessitated the further design of the current invention, in order to achieve a pull force in the range between 200 lbs-300 lbs of pressure, to separate a breakaway connector, in order to meet the European ATEX standards. The current invention has a structured integrally to achieve such.

Another aspect of the current invention is coupling the breakaway connector with a swivel mechanism, so as to add greater flexibility to the shifting and pivoting of the nozzle, and the fuel line hose, as it is being applied to replenish the fuel within a vehicle.

Another aspect of this invention is the usage of a such swivel connection in combination with the breakaway coupling. The applicants' assignee has a variety of patents upon swivel connectors. For example, Pat. No. Des. 268,612, shows a Swivel Connector for Hose or the Like. The prior U.S. Pat. No. 4,615,547 shows the internal mechanisms that make up the construction of a Multi-Plane Swivel Connector. Finally, the U.S. Pat. No. 6,550,817, further discloses a Bearinged Swivel Connector for Fuel Dispensing Nozzle. These are examples of various types of swivel connectors, for use in the fuel line hose for a fuel dispenser. But, using one of these swivels just adjacent to and constructed into the structure of a breakaway connector, it is submitted, may not have been previously attempted.

SUMMARY OF THE INVENTION

The concept of this invention is to provide a fuel line breakaway coupler that is secured by a plurality of spaced magnets, which are conveniently held apart by means of a counterbored spacer that provides for uniformity of magnetic force to keep the coupler connected when applied in a fuel line, but because of its unique structure, when an excessive force within the range of 300 lbs or more is exerted upon the fuel line, the coupler will break away, to prevent any excessive damage to the fuel dispenser, or the vehicle, in which the nozzle locates. Furthermore, the breakaway of this invention, as described, is integrated into the structure of a swivel connection, so that the nozzle which may connect directly with the swivel, or may locate upon the upper part of the dispensing hose, and integrate both the breakaway and the swivel within the dispensing hose, so the nozzle and the hose can be freely oriented in a variety of directions through the use of the integrated swivel, to facilitate its usage and application when connected with the dispenser for the delivery of fuel to a vehicle.

The particular breakaway coupling of this invention is of a relative thin construction, providing a first or inner sleeve having a cover at one end, with the cover having an aperture provided therethrough, and through which a part of the fuel line hose coupling or connector locates, for securement with said sleeve. Provided within the sleeve is a metal annulus, one that is subject to magnetic attraction, and the annulus fits around a part of the connector that partially inserts into the sleeve, during its installation. The metal annulus is held in place by means of a fastener, such as a resilient E-clip, that tightly locates within a groove formed around the inner part of the connector, in order to hold the metal annulus in place, thereby providing for at least one half of the breakaway coupler, when applied to the fuel dispensing hose. That particular part of the hose connector includes internally a valve seat and a check valve that is spring biased into closure, upon its valve seat. And, the check valve presents a socket, internal of the sleeve, that cooperates with a corresponding check valve of the other part of the coupler, to maintain the breakaway in an opened condition, to allow for free flow of gasoline or other fuel therethrough, when fully installed.

A second outer sleeve is provided, and the second sleeve incorporates a preferably magnetic continuous annulus that holds the various magnets, that secures the breakaway coupling into a connected condition, during its routine usage. The magnetic continuous annulus includes just that, a circular annulus that has an annular base, and has a series of circumferentially arranged counterbores provided around its perimeter, forming a series of round counterbores, and shaped magnets are strategically arranged within the counterbores of the base, with the annular functioning as a means for not only spacing the magnets around the perimeter of the annulus, so that the counterbored annulus presents a series of outwardly directed circular openings, and into which the magnets insert, so that the counterbored annulus provides a means for arranging the magnets equally spaced, around the circumference of the base, when it is assembled for application. Thus, a significant amount of the magnetic flux is directed towards the first sleeve metal annulus. Upon the spacer, and the arranged magnets, is a cover ring, of thin line construction, and which may be anywhere from 0.015 in-0.050 in, or more, in thickness, and it is held on top of the counterbore annulus, and the magnets, not only through magnetic attraction, but is further held in position by means of another E-clip, to secure the outer sleeve and its magnetic means in position, to function as the breakaway coupler. The cover ring provides a convenient dissemination of the magnetic flux, which attracts the metal annulus of the first sleeve, to hold the entire unit in its coupled position, as it is assembled and readied for usage. As previously explained, since the annulus has counterbores provided in it, with the magnets are conveniently spaced equally apart around its circumference, its magnetic attraction is directed towards the metal annulus of the first sleeve, and as such it has been found that that relationship of the various metal annulus, of the first sleeve, the counterbored annular separator of the second sleeve, has significantly enhanced the force required to separate the two parts of the breakaway coupler, up to approximately 300 lbs of force, which brings the breakaway coupler into compliance to meet the conditions of the various standards established for breakaways, not only in the United States, but also in Europe, and throughout the world, so that the product has utility worldwide, in its application.

Once again, a hose connector for the opposite end of the fuel line hose, or which may connect with the swivel connector of this invention, as to be subsequently described, partially inserts within the cover of the outer sleeve, extends through the magnetic assembly, and is secured in position within the outer sleeve by means of another fastener, such as a resilient E-clip as previously explained. This holds the outer sleeve to the fuel line, or its swivel connector, or even to the backend of the nozzle, as can be understood. The fuel line hose connector locates primarily within the second or outer sleeve, and also includes a check valve and a valve seat, similar to that of the first connector, the valve being spring biased into closure upon its seat, but the valve includes an extension pin, that sets into a socket of the first check valve, to bias both of the check valves into an unseated condition, within the breakaway coupling, when it has been joined together and magnetically held into closure, when readied for application in the fuel line hose, as assembled for fuel flow during usage.

The portions of the hose or swivel connectors that remain outside of the assembled breakaway are externally of their respective first and second sleeves and extend for some distance, and are multisided in configuration so that a wrench or other tool can be applied thereon, to aid in their installation onto the ends of the contiguous fuel line hose, or nozzle, or the swivel, when assembled. Actually, these parts of the hose connectors are preferably hexagonal of shape, to allow for the installation of a wrench, during application.

In addition, each of the integral cover portions of the respective first and second sleeves may include some counterbores, as can be seen in the parent application, that are of a size slightly greater than the ends of the shaped hose or other connectors that locates therein, so as to provide for a seating and snug fit of all of these components together, when fastened into their usable configuration. In addition, each hose connector has a channel provided centrally therethrough, and the portion of the channel within each hose connector that remains exteriorly of the cover part of each sleeve is internally threaded, so as to conveniently allow for the hose connectors to be threadedly engaged onto a corresponding fitting provided at the end of each of the adjacent fuel line hose, swivel, or even a nozzle, and to which the breakaway coupling may be installed.

A further concept of this invention is to attach a swivel to the breakaway coupling. In that way, the entire assembled device may be secured to the back end of a nozzle, and not only have the breakaway conveniently located thereat, but also have a swivel that allows for the manipulation of the nozzle, when it is taken from the dispenser, and inserted into the fill pipe of the vehicle, when delivering fuel thereto.

The swivel contains first and second parts, which are interconnected together to provide a turning of one part with respect to the other, and include various O-rings thereat, in order to provide a fluidic seal. In addition, detents that are spring biased interconnect between the two components, in order to furnish some pressure thereat, to provide securement of the two swivel parts together, and to facilitate their turning during usage.

The concept of this invention is to provide a conveniently spaced and arranged magnetic continuous annulus, that fits within one of the sleeves, and which is assembled using standard round magnets, that are properly and equally spaced in their positioning upon the annulus base, providing for manual installation of these components together, because of the strong magnetic attraction of the standard magnets disposed therein. Preferably, the annulus base includes a series of counterbores, in which the round magnets locate, and in that manner, the magnetic attraction is greatest at the surface of the exposed magnets, which provides for a greater magnetic force attraction with the continuous annulus, of the first sleeve, when securing the breakaway into connection, for usage. A thin plate or covering ring annulus is arranged over the magnets, and its spacer, and this cover ring also provides for a dissemination of the magnetic force and flux that attractively holds the metal annulus of the other sleeve, when the two are brought together into connection, when the coupler is prepared for installation and usage.

Then, the concept further includes the application of a swivel, to the breakaway coupling, so that these two components can function together, to provide both the benefits of a breakaway, and to furnish easy manipulation of any nozzle connected thereto, to facilitate its usage and application by the car owner when filling his/her automobile fuel tank.

This describes and provides a summary of the various components, and their functionality, and the means for providing for their more efficient usage and application within a breakaway coupling, that may have a swivel proximately connected therewith, for use within a fuel line dispensing hose, or at the end of such, so as to obviate or at lest lessen the chances of damage to either the dispenser, or a vehicle, should one inadvertently drive off after self servicing of the automobile during fueling, and to provide for ease of manipulation of the nozzle, in preparation for its usage.

It is, therefore, the principal object of this invention to provide a breakaway coupling, of minimum components, which is connected in association with a fuel line swivel, and all of which may be secured to a proximate nozzle, to facilitate their usage and application, in addition to safety, when using the nozzle to fill a vehicle, of any type.

It is another object of this invention to provide a breakaway coupling having those minimum of components, which are easily assembled, and provide a uniformity of directional magnetic force that holds the coupling into its connected position, but which can be broken free and separated, when the fuel dispensing hose is subjected to significant force.

Another object of this invention is to provide a swivel, of two parts, that have fluidic seal between them, but yet provides great flexibility in the shifting and moving of the nozzle, and the fuel line hose, particularly when removing the nozzle from the dispenser, and locating it within the fill pipe of the vehicle.

Still another object of this invention is to provide a breakaway coupling that only includes a small number of preassembled components, which when installed together, furnish a magnetic coupling that provides uniformity of magnetic force, at a high level, in order to hold it in its installed position, but yet will break apart when excessive force is exerted thereon.

Yet another object of this invention is to provide a magnetic coupling within a fuel line breakaway, where the magnetic flux is directed towards one surface of the arranged magnets, to increase the amount of force necessary to achieve separation of the breakaway connector, in the event that excessive force is inadvertently applied to the same during usage.

Still another object of this invention is to provide a magnetic breakaway coupling that complies and meets the standards for the amount of force necessary to separate a breakaway coupling when used within a fuel line hose and installation.

Still another object of this invention is to provide a breakaway coupling that can easily be reopened, when it needs to be serviced, through the use of a couple of tools, such as screwdrivers, that bias against the first and second sleeves of the coupler to provide for their manual separation.

Another object of this invention is to provide means for uniformly mounting various standard magnets, that do not have to be custom manufactured, to provide significant attraction force for holding a breakaway coupling in its assembled condition, and which will not separate unless subjected to substantial linear force.

Still another object of this invention is to provide a magnetic means, including a base, that holds round or other shaped magnets, conveniently held by a counterbored spacer, into very discreet and precise dimensions spaced apart, and having a cover plate that aids in dissemination of the magnetic forces for attracting a metal annulus of the couplers other sleeve, when it is assembled for installation and usage within a fuel dispensing hose.

These and other objects may become more apparent to those skilled in the art upon review of the summary of the invention as provided herein, and upon undertaking a study of the description of its preferred embodiments, in view of the drawings.

DESCRIPTION OF THE PREFERRED EMBODIMENT

Figure 1:
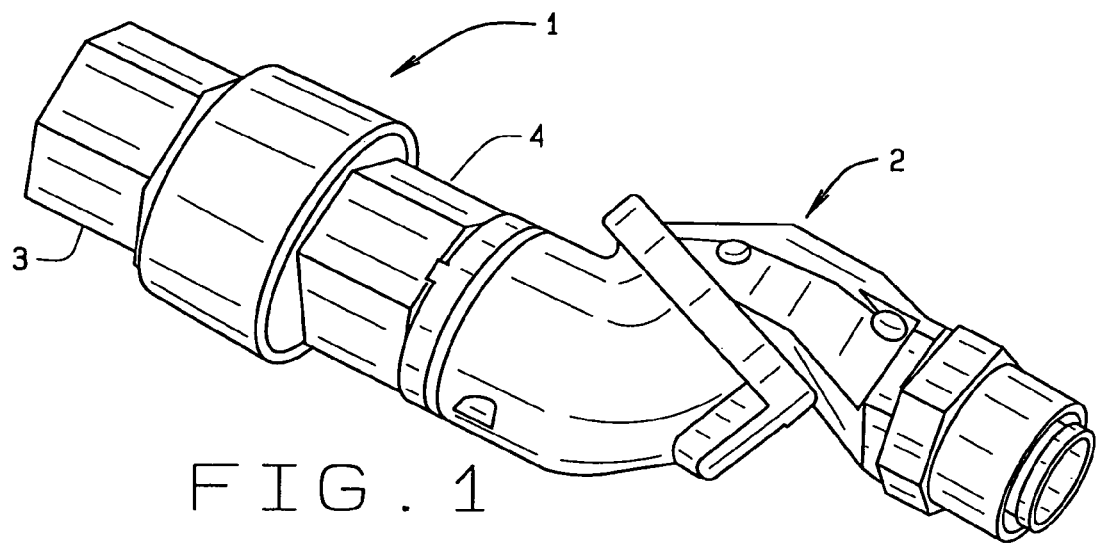
FIG. 1 provides an isometric view of the breakaway coupling with attached swivel connector of this invention.

In referring to the drawings, and in particular FIG. 1, the fuel line breakaway coupler secured by a plurality of magnets, of this invention, is readily disclosed, at reference character 1. The device connects within the fuel line hose, or to a nozzle (not shown), and includes its connector bodies 3 and 4, that are capable of being secured to the ends of either the hose, a nozzle, or a swivel connector, when securing the breakaway coupling 1 together, as can be noted.

Figure 2:
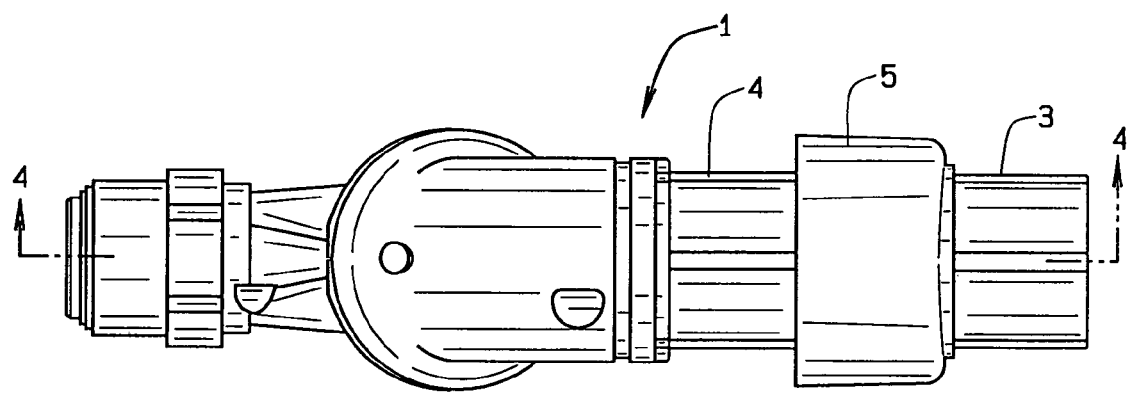
FIG. 2 provides a top view of the breakaway coupling with swivel connector of FIG. 1.
Figure 3:
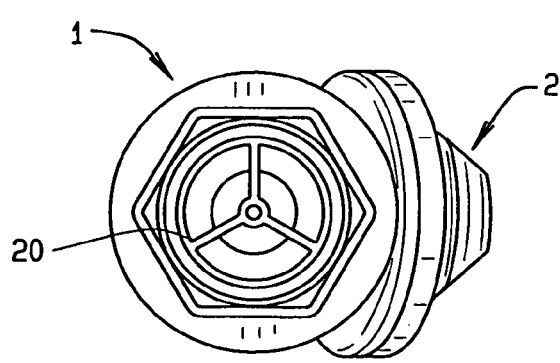
FIG. 3 is a back end view of the breakaway coupling, showing internally thereof the spider mount that holds one of the check valves of the coupling in place.
Figure 4:
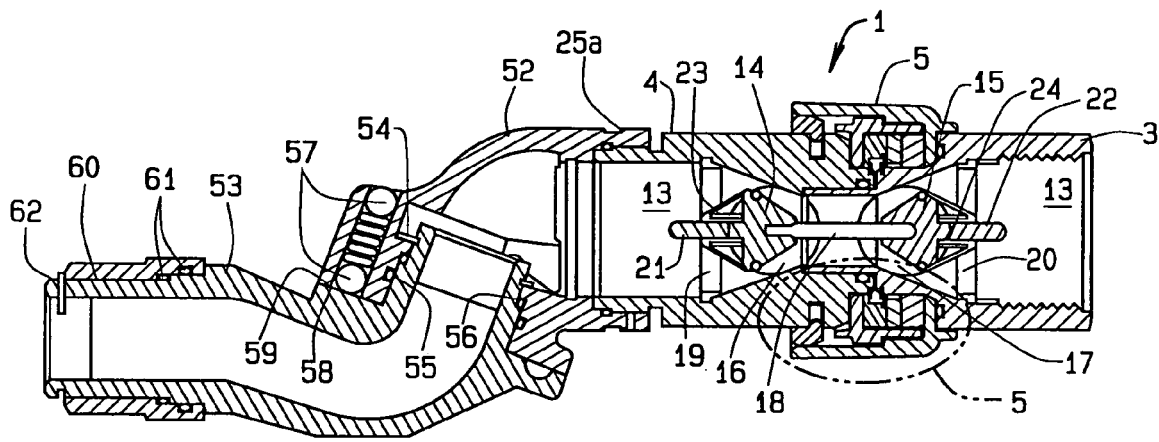
FIG. 4 provides a longitudinal sectional view along the length of the breakaway coupling with swivel connector, taken along the line 4-4 of FIG. 2.
Figure 5:
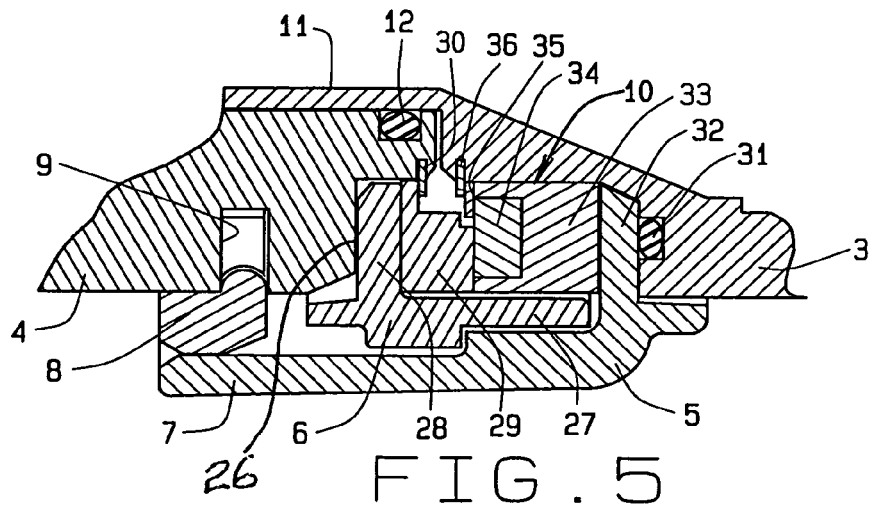
FIG. 5 is an enlarged view of the segment of the breakaway coupling, taken along the line 5 of FIG. 4.

As can be noted in FIG. 2, which the top plan view, it can be seen that the breakaway coupling 1 includes an outer sleeve like member 5, which connects with the hose connector 3, while an inner sleeve like member 6 secures with the connector body 4, as can also be seen in FIGS. 4 and 5 of the application. Both of these inner and outer sleeves provide the means for enclosing the magnetic operative components of this invention, wherein the inner sleeve 6 mounts its magnetic component, and the outer sleeve 5 with its connector 3, provides an overall covering of its magnetic components, that form the magnetic breakaway coupler of this invention. The detailed interconnection and location of these various components, within the breakaway connector, can be seen in our previous and copending application, as earlier reviewed, in the cross reference to this application, all of which technical information is incorporated herein by reference.

The more specific components operatively associated with these various sleeves, the magnetic holding components that secure the breakaway together, during routine usage, and the various check valves provided within the breakaway coupler, can be more accurately seen in said FIGS. 4 and 5, herein.

As noted in these figures, the outer sleeve 5 includes an extending sleeve like portion 7, which cooperates with a dust guard 8 that partially fits within a groove 9 of the connector 4, as can be noted. In this position, it prevents dirt or dust from entering into the interconnection between the two breakaway portions 3 and 4, and prevents dirt from accessing into the magnetic means 10, that secures the breakaway together, during usage.

Where the two connectors 3 and 4 overlap, interiorly, the connector 3 has an inner extending channel, as at 11, that seals by means of an O-ring 12 to the interior surface of the connector 4, to assure that there is no fluidic leak as fuel travels through the inner channel 13 of the breakaway connector during routine fuel flow. See FIG. 4.

As can also be seen, there are a pair of check valves 14 and 15, operatively associated within the channel 13 of each of the connectors 3 and 4, and while the breakaway is connected, these check valves are spaced inwardly within each of their respective connectors, providing flow paths, as along 16 and 17, to allow fuel to freely flow through the breakaway coupling, during routine usage. As reviewed in the previous application, the check valves 14 and 15 are held apart by means of a valve extension 18, which fits within the check valve 15, and biases against the check valve 14, to keep the two separate, and to maintain the channel 13 opened, through the breakaway during routine usage to allow unencumbered fuel flow. Each of the check valves are held in position by means of a spider like snap cone 19 and 20, respectively, that allows fuel to freely flow therethrough, but at the same time, the integral check valve stems 21 and 22 are biased by their springs 23 and 24 towards each other, such that when the breakaway coupling is disassembled, by means of encountering excessive force, the various check valves 14 and 15 will seat by means of their O-ring seals against the inner surface and valve seats of their respective connectors, 3 and 4, as can be understood.

Figure 6:
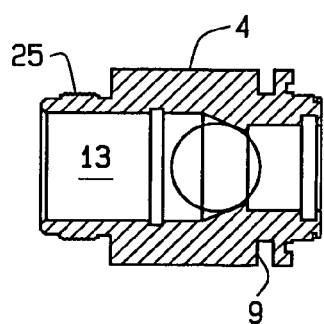
FIG. 6 is a sectional view of one of the hose connectors that also mounts a check valve therein for stopping fuel flow when the breakaway disconnects.
Figure 7:
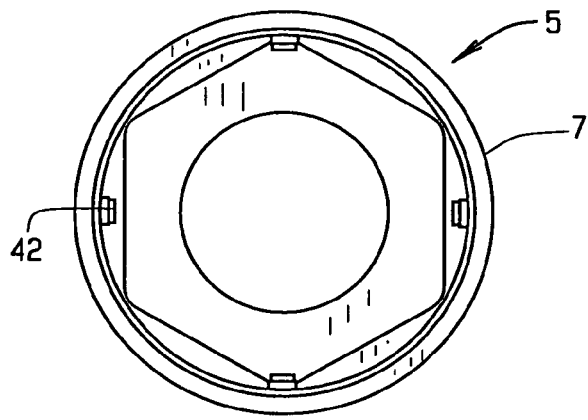
FIG. 7 is a front end view of the outer cover forming an outer second sleeve for the breakaway connector of this invention.
Figure 8:
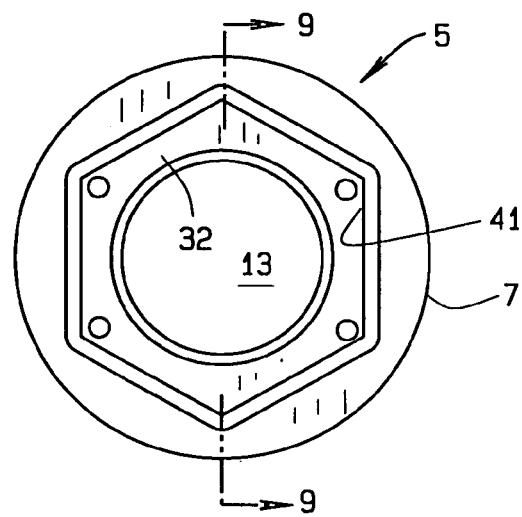
FIG. 8 is an interior view of the outer second sleeve cover of FIG. 7.
Figure 9:
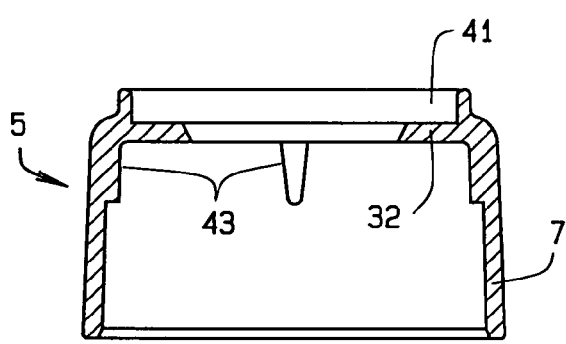
FIG. 9 is a sectional view of the outer second sleeve cover, taken along the line 9-9 of FIG. 8.

As can be seen in FIG. 6, the connector 4 includes its internal channel 13, and its external threads 25 are readily available for securement to a hose end, a nozzle, or in this particular instance, for securement with one end of the swivel connection, as noted at 25a. The surface of the connector 4 is preferably of a hexagonal shape, as noted in FIG. 1, to facilitate its securement, in this particular instance, to the swivel connection. The annular slot 9 is furnished for cooperating with the dust guard 8, as previously reviewed.

The magnetic aspects of this breakaway can be seen in FIG. 4, and in the enlarged view of its components, as can be noted in the partial view of FIG. 5. As can be seen, the connector body 4, at its front end, mates with the integral cylinder portion of the connector body 3, to provide the flow path through the breakaway. The base of the inner sleeve 6, which also forms the inner sleeve of the magnetic connector, biases against the shoulder 26 of the connector 4. The base 6 has a forwardly extending sleeve like portion 27 that generally surrounds the magnets of the connector, as can be noted. It also has the inwardly extending flange 28 that rests against the shoulder 26 of the connector, as noted. A magnetic insert ring or annulus 29 is cradled within the inner sleeve 6, and these components are held in position by means of a retainer ring 30 that secures them within position to provide for their retention with the connector body 4, as can be noted.

The connector body 3 as previously reviewed includes an O-ring 31 that biases against a back surface of the outer sleeve or cover 5, and provides a further seal against any fuel leakage from the breakaway coupler. The inner extending integral flange 32 of the sleeve 5, has mounted against it a magnetic ring spacer 33, and the spacer mounts a series or plurality of equally spaced circumferentially arranged round magnets 34, that generally are in magnetic contact with the insert annulus 29, in order to provide for the magnetic attraction and holding power for securement of the breakaway connector together, when assembled for usage. A magnet retainer ring 35 holds the various magnets 34 in place, within the magnet ring separator of spacer 33, as can be noted. A further retainer ring 36 secures the magnets and its retainer ring securely within the magnet ring separator 33, as can be observed.

Figure 20:
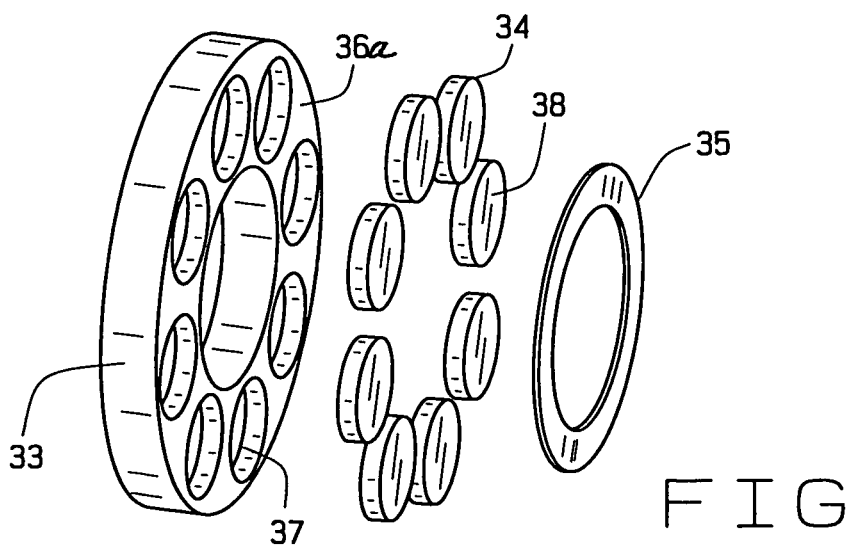
FIG. 20 is an isometric view of the continuous magnet holding separator showing a series of equally spaced circumferentially arranged counterbores, for holding the shown round magnets, and further disclosing the thin line metal plate, of FIG. 13, that holds the magnets in place within the coupler.

The more specific construction of the magnet retainer separator 33 and its various magnets 34, in addition to its magnet ring retainer 35, can be more accurately seen in FIG. 20. Their particular materials, from which some of these components are fabricated, such as the magnetic ring separator 33, may be of magnetic material such as steel so as to enhance the drawing power of the various magnets 34, which it secures. Furthermore, in order to direct the magnetic flux of the magnets 34 forwardly, so as to more functionally secure with the magnetic insert annulus 29, the front surface 36a of the separator 33 has a series of equally spaced counterbores, as noted at 37, which counterbores extend only partially through the separator 33, so that when the magnets 34 are located in place in alignment within their respective slots, or counterbores, their magnetic flux will be primarily directed forwardly, since the frontal faces 38 are what are primarily exposed for magnetic attraction, particularly with the surface of the contiguous magnetic insert annulus or ring 29, as can be understood.

Figure 16:
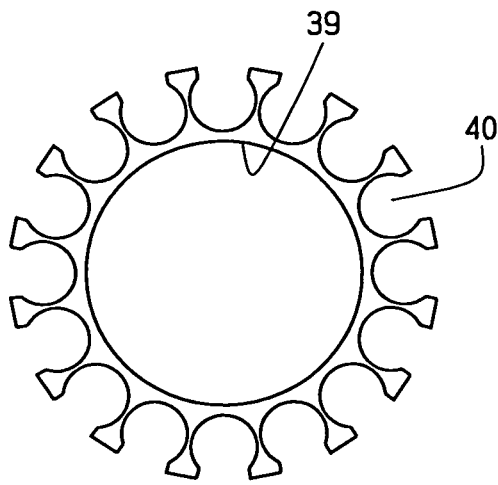
FIG. 16 discloses one form of the magnet separator that secures the magnets conveniently separated in their mounting within the breakaway coupling.
Figure 17:
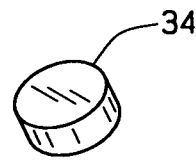
FIG. 17 shows one of the round magnets used in this coupling.

A further and earlier embodiment of a magnet ring separator can be seen in FIG. 16. It also includes an insulative formed device, having a ring configuration as noted at 39, and includes a series of integral slots, as at 40, around its perimeter. It is within these slots that the same round magnets 34 insert, for use for attaining magnetic attraction with the magnetic insert annulus 29, in a similar manner to that as described for the separator 33. A magnet 34, as noted, can be seen in FIG. 17, fits within each foresaid slot.

This type of separator as shown in FIG. 16, and which is an earlier embodiment of the applicant's magnetic coupler, has slots that extend entirely through the separator. Thus, the magnets 34 were not only attracted to the surface of the magnetic insert ring 29, but would also be attracted to the inward flange 32 of the outer sleeve body 5. Hence, its magnetic attraction was diluted, so that only part of the magnetic strength was used to hold the breakaway coupler together, in this particular embodiment. As previously summarized, the magnetic pull force of the magnets, within the breakaway connector, utilizing the type of separator as shown in FIG. 16, may have attained a magnetic attraction for somewhere in the range of 100 lbs of force. But, by utilizing the style of separator 33 as shown in FIG. 20, the magnetic pull force of the breakaway connector, or that force required to cause its separation, has increased to within a range of 300 lbs of force, or greater, simply by using a counterbore method of mounting of the magnets 34, within the magnetic ring separator, when it is manufactured and assembled. As previously stated, this magnetic ring separator is made of metal. By counterboring it, and placing the magnets therein, this actually enhances the pulling force of the arranged magnets. It may be desirable, in some instances, to make the ring separator of an insulative material, such as with the earlier embodiment, the insulative material maybe nonmagnetic. Thus, by increasing the force by at least two-thirds, this particular breakaway coupler, using the style of separator as shown at 33, now meets the standards required for the pull force necessary to separate the breakaway during usage, and is now in compliance with rules and regulations worldwide, including meeting the requirements of the European standards, and the amount of pull force necessary to cause separation of a breakaway coupler, during application and usage.

Various other separate components for this breakaway coupler include the shown structure for its outer sleeve cover 5 and as can be seen, it includes its outer cover portion 7 and further has a recessed segment as at 41, which is formed of a multisided shape, such as the hexagonal as shown, so that the front end of the connector body 3 may locate therein, when these parts are assembled. The flow through channel 13 can be noted provided through the connector body and its inner and outer sleeves. The inner circumferential flange 32 can also be seen. Various tabs 51 of the dust guard 8 cooperate with groove 9, or connector body 4, and hold it in position, are also noted. The integral tabs 43 are provided for limiting the extent of insertion of the magnetic base inner sleeve 6, and its connector body 4, within the outer sleeve 7 of the other connector body 3. These also fix the coupler parts against rotation.

Figure 11:
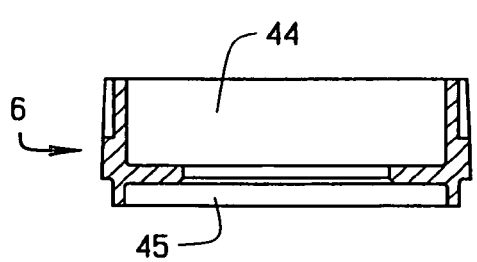
FIG. 11 is a transverse sectional view taken through the inner first sleeve shown in FIG. 10.
Figure 10:
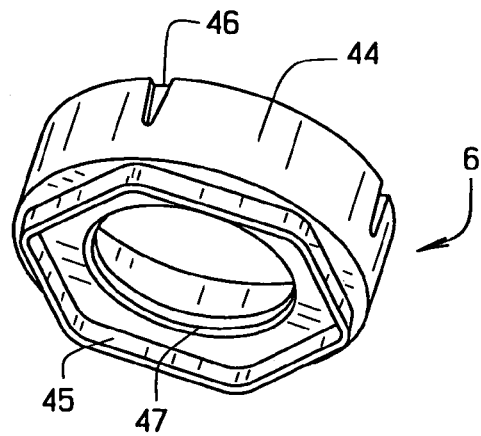
FIG. 10 is an isometric view of the inner first sleeve that provides the means for mounting of the annulus or ring within the breakaway coupling.

FIGS. 10 and 11 show the construction of the magnetic base inner sleeve 6, as previously reviewed. As noted, it includes a sleeve like portion 44, extending from one edge, and a short rearward extension 45, which is also hexagonal shaped, in order to accommodate the corresponding shape of the connector body 4 that fits therein. This device also has slots 46 that cooperate with the tabs 43, to assure proper alignment of the connector components, when assembled. This inner sleeve also has an opening 47 that fits over the connector body 4 when fully assembled.

Figure 12:
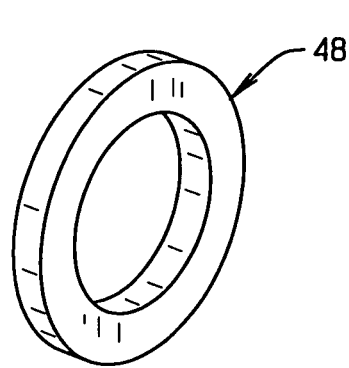
FIG. 12 is an isometric view of the magnetic annulus or ring that locates within the inner first sleeve of the connector.

FIG. 12 shows another form of magnetic ring annulus, in this case, comprising a ring 48 that may just hold onto the magnets in position, when the breakaway is assembled.

Figure 13:
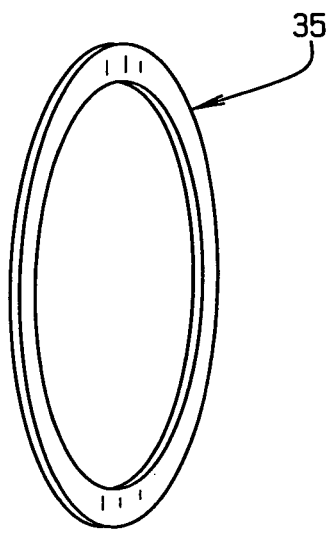
FIG. 13 is an isometric view of the magnet retainer that aids in securing the emplaced magnets into the outer sleeve of the breakaway coupling.

FIG. 13 shows the thin line construction of the magnetic ring retainer 35, as previously explained.

Figure 14:
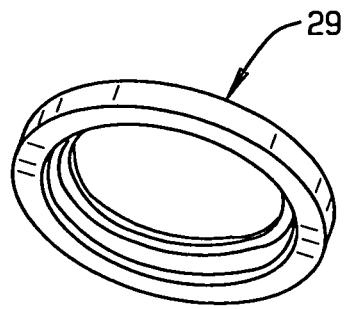
FIG. 14 discloses the specific insert magnetic ring that mounts within the first inner sleeve of the coupling to hold the magnetic ring in place within the assembled coupler.
Figure 15:
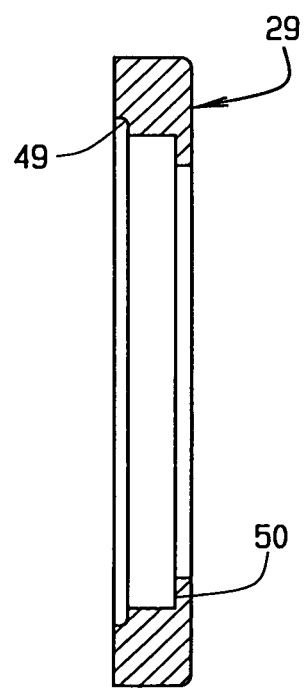
FIG. 15 is a cross sectional view of the insert magnetic ring or annulus of FIG. 14.

FIGS. 14 and 15 disclose the structure of the magnetic insert ring or annulus 29, and disclosing the various contours, as at 49, that furnishes clearance for locating of the thin line magnetic ring retainer 35 thereat. In addition, the inwardly extending flange 50 cooperates with the retainer ring 30 to secure this insert annulus to the inner sleeve 6, and its connector body 4, as previously explained.

Figure 18:
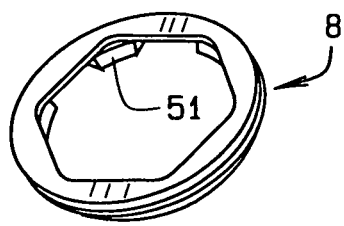
FIG. 18 shows an isometric view of the dust guard that mounts between the outer second sleeve and the first hose connector of the coupling.
Figure 19:
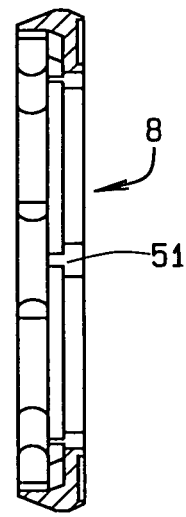
FIG. 19 is a transverse sectional view of the dust guard shown in FIG. 18.

FIGS. 18 and 19 show the configuration of the dust guard 8. Generally such a guard is made of rubber or polymer of low durometer characteristics, and which can be secured into position between the outer sleeve 7, and the connector body 4, as noted in FIG. 5. It includes an annular configuration, as noted, for locating within the spacing between these two components, and has a series of integral tabs 51 that fit within the annular groove 9 of the connector body 4, to secure the guard in position.

The components as just previously described generally make up the structure of the breakaway coupler portion of this development. As previously stated, this breakaway coupler also is fabricated for operating in connection with a swivel connector, so as to enhance the versatility of usage of the overall assembly, when holding a nozzle in position, and manipulating it for direction, as it is removed from the dispenser, and inserted into the vehicle fill pipe, for replenishing the vehicle with fuel.

The swivel connector can generally be seen in FIGS. 1, 2 and 4 of these drawings. As noted, the swivel includes a female swivel portion 52, which is adapted for threadedly connecting onto the threaded end 25 of the connector body 4. See also FIG. 6. In addition, the male swivel portion 53 is connected for pivoting within the swivel portion 52, as can be seen. A retainer ring or clip 54 secures these two components together, as noted, and a series of O-rings, as at 55 and 56, provide for a fluidic seal between these two components. A series of detents, or bearings, as at 57, which are spring biased apart, by means of the spring 58, are provided around the circumference of the swivel, and place slight pressure between the surface 59 of the male swivel component, and the female part, and facilitate the swivel movement between these two components, and to prevent the two parts from becoming loose, in their connection.

A swivel nut 60 is secured by O-rings 61 and is held in position by means of the retainer ring 62 to the back end of the male swivel portion 53. This provides and furnishes another plane of swivel for the swivel connector after its installation within the fuel dispensing means. In this particular instance, the swivel nut 60 may secure with the back end of the fuel nozzle, and be tightly connected therewith, but yet afford some additional degree of swivel or pivot due to its means for mounting of the swivel nut onto the connector.

The foregoing provides a thorough analysis of the various components, their functionality, and the results that are desired to be obtained therefrom, for this combination improved magnetic breakaway coupling with swivel connection. Variations or modifications to these structures of this invention may occur to those skilled in the art upon reviewing the subject matter of this invention. Such variations or modifications, if within the spirit of this invention, are intended to be encompassed within the scope of any claims to patent protection issuing upon the same. The description of the preferred embodiments set forth herein is done so for illustrative purposes only.

We claim:

1. A breakaway coupling for use in fuel dispensing and capable of separation under an excessive force exerted upon the fuel line hose in which the coupling is installed;

said coupling including an inner sleeve, said inner sleeve having an opening in said inner sleeve and into which a connector body partially inserts, a metal annulus provided in said inner sleeve, said annulus capable of being connected with said inner sleeve;

said coupling including an outer sleeve, said outer sleeve having an opening in said outer sleeve and into which a hose connector partially inserts, a ring separator provided in said outer sleeve, said separator having a series of counterbores provided in said separator, and for accommodating shaped magnets with the counterbores, and said magnets capable of being magnetically secured with the metal annulus of the inner sleeve, to hold the breakaway coupling together during routine usage;

said ring separator mounting said series of magnets strategically located with the counterbores, said ring separator being formed of magnetic material, and a ring retainer provided for securement of the magnets within the ring separator, wherein one face of said ring retainer abuts an outermost face of the ring separator and a portion of each of the magnets, and a second face of said ring retainer abuts a retaining ring; and said outer sleeve capable of fitting over the inner sleeve and the metal annulus when the breakaway coupling is installed for usage.

2. The breakaway coupling of claim 1 wherein said magnets are round.

3. The breakaway coupling of claim 2 wherein each of said connector body and said hose connector includes a check valve, when said outer sleeve and inner sleeve are coupled together said check valves are unseated from valve seats and allow fuel to pass through during dispensing, and when said coupling is disconnected, said check valves are seated upon the respective valve seats and prevent the flow of fuel from the breakaway coupling.

4. The breakaway coupling of claim 3 and wherein said series of round magnets are equally spaced apart in an annular array as held within the counterbores of the ring separator, and said ring retainer arranged over said magnets, to hold said magnets in position within the ring separator.

5. The breakaway coupling of claim 4 wherein said inner and outer sleeves each having an integral cover portion, each of said cover portion having an opening provided centrally through the cover portion, and said connector body and said hose connector partially inserting through respective sleeve cover openings.

6. The breakaway coupling of claim 5 wherein each of said sleeve cover has a counterbore in each of said sleeve cover, and the connector body and hose connector provided for seating within the respective cover portion counterbores when secured.

7. The breakaway coupling of claim 6 wherein each of said connector being of hexagonal shape to accommodate mounting of a tool during installation or removal.

8. The breakaway coupling of claim 7 wherein the inner sleeve has a length substantially lesser than a length of the outer sleeve.

9. The breakaway coupling of claim 8 wherein said inner sleeve fits within said outer sleeve when the coupling is assembled for installation and usage.

10. The breakaway coupling of claim 9 wherein each of said connector has an internal channel provided to furnish passage of fuel through the breakaway coupling during dispensing, and one of said connectors having internal threads to provide for attachment to the fuel line hose when prepared for usage.

11. The breakaway coupling of claim 10 wherein the force required for separating the magnetic breakaway coupling is approximately 300 lbs of force.

12. A breakaway coupling for use in fuel dispensing and capable of separation under an excessive force exerted upon a fuel line hose to which the coupling is installed, said coupling including a connector body, an inner sleeve secured with said connector body, said inner sleeve having an opening into which the connector body partially inserts, a metal annulus provided in said inner sleeve, said metal annulus capable of being connected with the inner sleeve to the connector body;

said coupling including an outer sleeve, said outer sleeve having an opening into which a hose connector partially inserts, a magnet ring separator provided in said second sleeve, said magnet ring separator capable of also being connected with the hose connector that partially inserts within said outer sleeve;

said magnet ring separator including an annular member, a series of counterbores provided within said magnet ring separator, a series of round magnets arranged within the counterbores of said magnet ring separator, said counterbores within the magnet ring separator being equally spaced apart around a circumference of the ring separator, a retaining ring secures a magnetic magnet ring that is arranged over the magnets and the magnet ring separator retainer arranged over the magnets and the magnet ring separator; and said inner sleeve with a metal annulus capable of fitting within and engaging the magnets of the outer sleeve, when the breakaway coupling is installed for fuel dispensing.

13. The breakaway coupling of claim 12, and including a swivel connector, said swivel connector attaching with the connector body of the breakaway coupling and furnishing pivotal characteristics to the coupling during usage.

14. The breakaway connector of claim 13, wherein said swivel connector comprises a pair of swivel portions, a female swivel portion capable of connecting with the connector body of the breakaway coupling, and a male swivel portion pivotally connecting with the female swivel portion to form the swivel connector when assembled.

15. The breakaway connector of the claim 14, and including a swivel nut provided upon the male swivel portion and furnishing further pivotal characteristics to the swivel connector when secured with the breakaway coupling and installed upon the fuel line hose for facilitating the dispensing of fuel to a vehicle.

16. The breakaway coupling of claim 12, wherein said ring separator is formed of a magnetic metal.

17. The breakaway connector of claim 12 wherein said ring separator is made of an insulative material.

* * * * *